Oct. 11, 1932. S. HEIDEN 1,882,589
AEROPLANE
Filed Feb. 27, 1930 2 Sheets-Sheet 2

INVENTOR.
Simon Heiden
BY
ATTORNEY.

Patented Oct. 11, 1932

1,882,589

UNITED STATES PATENT OFFICE

SIMON HEIDEN, OF DETROIT, MICHIGAN

AEROPLANE

Application filed February 27, 1930. Serial No. 431,684.

My invention relates to a new and useful improvement in an aeroplane and particularly one of the heliocopter type.

It is an object of the present invention to provide an aeroplane having a wing structure which will assure maximum strength and at the same time offer a minimum resistance to the propelling of the vehicle through the air.

Another object of the invention is the provision in an aeroplane of means for driving the aeroplane forwardly and upwardly and controlling the direction of travel of the vehicle when going either forwardly or upwardly.

Another object of the invention is the provision in an aeroplane of a structure whereby the operator may, at will, elevate the plane to various heights without disturbing its horizontal position.

Another object of the invention is the provision of a guiding mechanism which may be moved in a plurality of directions.

Other objects will appear hereinafter.

The invention consists in the combination and arrangement of parts hereinafter described and claimed.

The invention will be best understood by a reference to the accompanying drawings which form a part of this specification and in which, Fig. 1 is a longitudinal central vertical sectional view of the invention.

Fig. 5 is a fragmentary view taken on lines 5—5 of Fig. 1.

Figure 1:
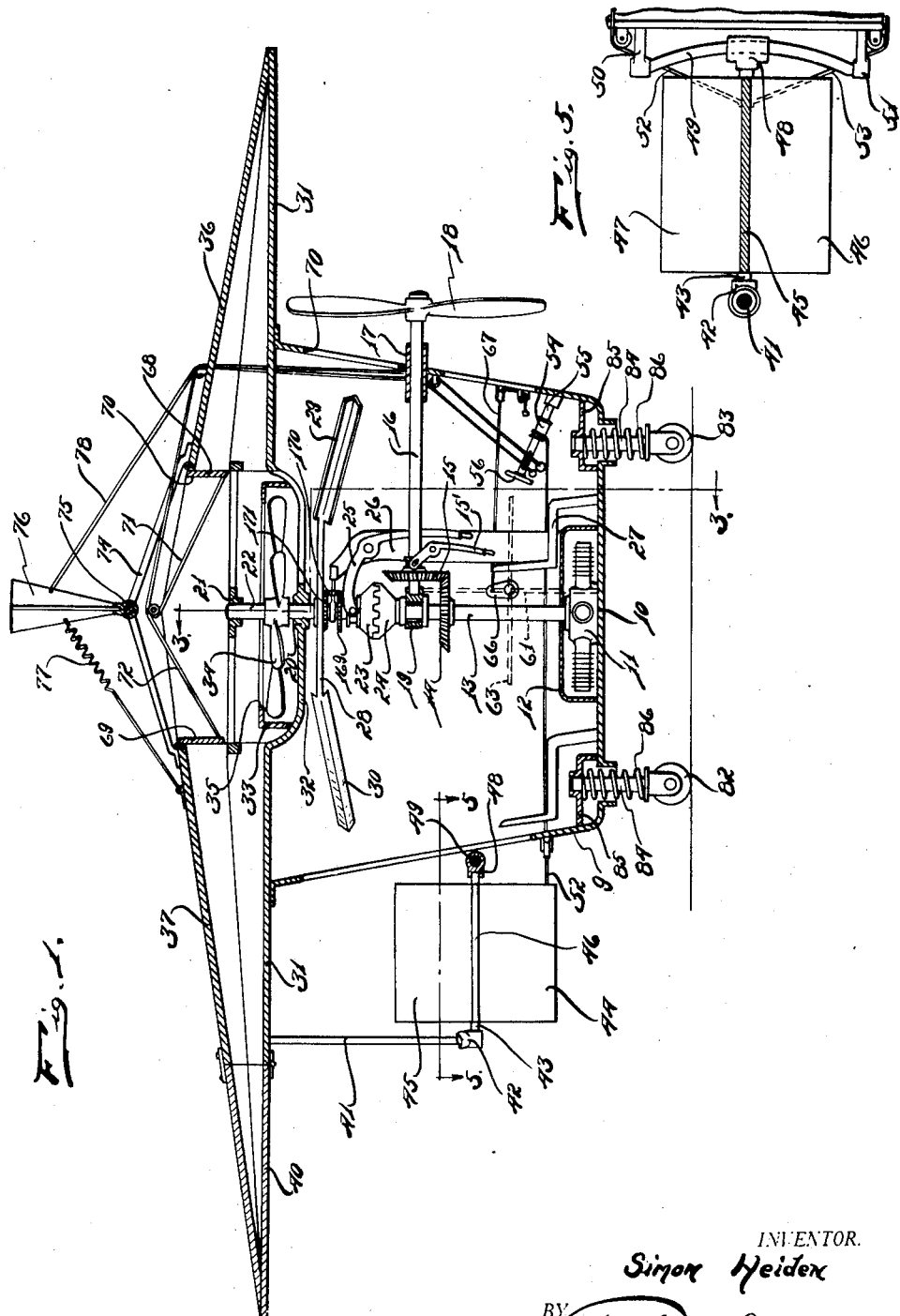

The invention comprises a body or housing 9, on the floor 10, on which is mounted the operating motor 11, which is covered by the box-like structure 12. Projecting upwardly from the motor 11 through the cover 12 is a shaft 13 having a bevel gear 14 fixedly mounted thereon and meshing with a bevel gear 15, which is mounted on the shaft 16 projected through the bearing 17 and carrying the propellor blade 18 which is used for driving the vehicle forwardly. The rear end of the shaft 16 is journaled in a socket formed in the collar 19 which is loosely mounted on the shaft 13. Journaled in bearings 20 and 21 is a shaft 22 which is in alignment with the shaft 13 and on which is slidably mounted the clutch section 23 which is designed to co-operate with the clutch section 24 fixedly mounted on the shaft 13. The clutch section 23 rotates in unison with the shaft 22 and when rocked by the clutch yoke 25 into the position shown in Fig. 1, the shaft 22 will rotate in unison with shaft 13. The clutch yoke 25 is pivotally mounted on the standard 26 and extended to a position to be accessible to the driver of the aeroplane who may be seated on the seat 27. Rotatably mounted on the shaft 22 is an arm 28 carrying the trough-shaped blades 29 and 30.

Figure 2:
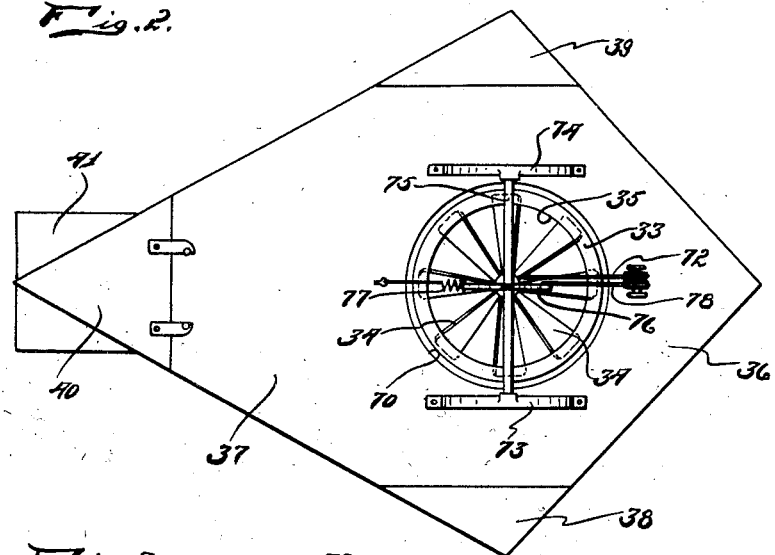
Fig. 2 is a top plan view of the invention.
Figure 3:
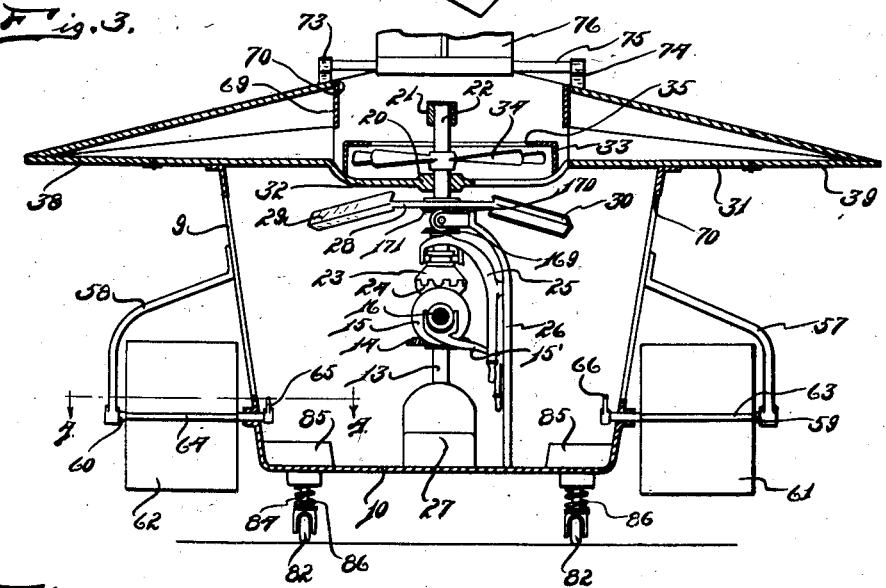
Fig. 3 is a view taken on lines 3—3 of Fig. 1 with parts broken away.
Figure 4:
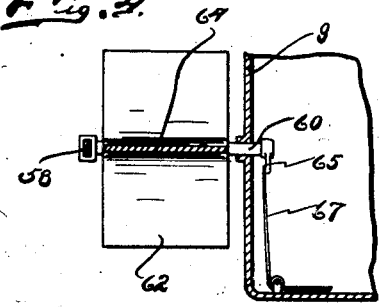
Fig. 4 is a fragmentary view taken on lines 4—4 of Fig 3.

The wing structure of the aeroplane comprises the horizontally disposed bottom 31 which forms a top for the body of the aeroplane and which is downwardly offset centrally of the body as at 32 to form a recess or cavity in which is positioned a propellor 34 which is fixedly mounted on the shaft 22. A housing or cover 33 is positioned over the propellor 34 and provided with a central opening 35. The top of the wing structure comprises the inclined members 36 and 37 which incline outwardly and downwardly adjacent the center of the body. As shown in Fig. 2, the shape of the wing structure is in the form of a quadralateral polygon and the vertices at opposite sides are hingedly mounted so that the portions 38 and 39 may be swung downwardly to permit the entry of the aeroplane into a hanger requiring less width than the spread of the wing when in operative position. The rear vertex of the wing structure or the tail 40 is also swingably mounted for tilting downwardly. A balance plate 41' projecting outwardly at opposite sides of this tail structure 40.

Secured to the member 31 and projected downwardly therefrom is a rod 41 on which is attached by a universal joint 42, the horizontally disposed rod 43 which forms an axis for the rudder, having the vertically extending wings 44 and 45 and the horizontally extending wings 46 and 47. The shaft 43 connects to a T 48 which is slidably mounted on the arcuate rod 49 secured in suitable brackets 50 and 51. The construction is such that the shaft 43 may swing on the joint 42, the T 48 travelling lengthwise of the arcuate rod 49. Connected to one side of the rudder is a cord 52 and a cord 53 connects to the other side and these cords being extended and wound upon a spool 54 which is fixedly mounted on the rotatable rod 55 on which is a hand wheel 56 so that the operator of the vehicle by turning the hand wheel 56 may determine the direction of travel of the vehicle.

Brackets 57 and 58 project outwardly from opposite sides of the body and serve to support shafts 59 and 60, on which are mounted the cross-shaped blades 61 and 62 and 63 and 64. The arm 65 and 66 connects to the shafts 60 and 59 and are connected to a suitable cable 67 which leads to a position accessible to the driver of the vehicle so that a rocking of these blades 61, 62, 63 and 64 may be effected.

Blades 68 and 69 are swingably mounted to serve as a closure for the opening 70, cables 71 and 72 connecting to these closures and being passed downwardly into the body accessible to the driver of the vehicle so that they may be swung to closed position when desired.

Mounted on the top of the wing structure are bearings 73 and 74 for the shaft 75 on which is swingably mounted the vertically extending guide rudder 76 which is normally held by the spring 77 in upright position and which may be rocked on its pivot by the cord 78.

Land gear comprising wheels 82 and 83 are mounted on studs 84 projected into the housing 85 and slidably therein the springs 86 serve to absorb the shock.

In operation when the motor 11 is started, the shaft 13 through the meshing of the gears 14 and 15 will effect a rotation of the propeller 18 which will have a tendency to drive the vehicle forwardly when the resistance offered by the contact of the ground with the wheels 82 and 83 is removed. When the operator is prepared to move out with the vehicle, the clutch section 23 may be brought into engagement with the clutch section 24, thus setting the blades 29 and 30 into rotation as well as blades 34 to produce the desired lifting effect. The speed with which this lifting effect is brought about will, of course, depend largely upon the speed of rotation of the shaft 22 but may also be regulated by opening or closing the closures 68 and 69, the raising effect being increased when the closures are in open position. By rocking the rudder 76, the vehicle may be propelled upwardly into any desired direction. In this upward movement by proper tilting of the blades 61, 62, 63, and 64, the speed of lifting the vehicle, as well as the direction of travel, may be regulated. The rudder, which will control the direction of upward movement of the vehicle on account of its mountings, has a maximum of freedom in its movement, thus facilitating to a large extent the guiding of the vehicle.

The blades 29 and 30 are so rotated that the closed edge leads leaving the open edges to follow, and on account of the downward tilt of these blades from the arm 28 an outward, upward, and downward motion is transmitted to the air. The air enters the circular opening 70 from above in ample volume and the blades 29 and 30 also force this air outwardly against the walls of the cabin or superstructure to assist in the lifting effect. By a rotation of the blades 29 and 30, a vacuum in any part of the vehicle is prevented so that there is no air resistance offered to the lifting effect. The blades 29 and 30 rotate in a direction opposite to the direction of the plates 34. The plates 34 are fixedly mounted on the shaft 22. A bevel gear 169 meshes with a bevel gear 170 which, in turn, meshes with the gear 171 carried by the arm 28 so as to effect the rotation of the arm 28.

The gear 15 is slidable on the shaft 16 and rotates with this shaft. This gear 15 may be moved into and out of mesh with the gear 15 by the lever 15'.

The wing structure as shown in Fig. 2 is of a kite-like nature or outline having the upper and lower surfaces which are spaced apart, the space being greater at the center of the wing structure.

While I have illustrated and described the preferred form of construction of my invention, I do not wish to limit myself to the precise details of structure shown but desire to avail myself of such variations and modifications as may come within the scope of the appended claims.

Having thus described my invention, what I claim is new and desire to secure by Letters Patent is:

1. An aeroplane wing of kite shape having a top; a bottom spaced therefrom, the distance between said top and said bottom being greater toward the center and narrowing until said bottom and said top engage each other at the outer edges, said top having at its center a circular opening, and a circular opening in said bottom registering with the opening in said top; and hinged extensions at the corners of said wing.

2. In an aeroplane, a kite shaped wing; hinged extensions at the edges of said wing; means for driving the aeroplane forward in a horizontal direction; rudder means on the sides of said aeroplane for balancing the same; rudder means on the top; a steering means for operating the rudders on the sides for regulating the elevation of the areoplane while in horizontal flight.

3. In an aeroplane having a body, a kite shaped wing, comprising: a top and a bottom, said bottom forming a top for said fuselage and meeting at its outer edges with said top, and said top being inclined outwardly therefrom toward the center and provided with an opening in its center; an inwardly offset portion on said bottom in registration with the opening in said top; and a horizontally disposed propeller rotatably mounted and positioned within said offset portion.

4. An aeroplane wing of kite shape, having a top; a bottom spaced therefrom, the distance between said top and said bottom being greater toward the center and narrowing until said bottom and said top engage each other at the outer edges, said top having at its center a circular opening, and a circular opening in said bottom registering with the opening in said top; a vertically extended shaft projected through said bottom at said opening; and a propeller on said shaft positioned above the opening in said bottom and below the opening in said top; and means for rotating said shaft.

5. In an aeroplane having a body, a kite shaped wing comprising: a top and a bottom said bottom forming a top for the fuselage and meeting at its outer edges with said top, and said top being inclined outwardly therefrom toward the center and provided with an opening in its center; an inwardly offset portion on said bottom in registration with the opening in said top and having an opening formed therein; a vertically extended shaft projected centrally through said offset portion; a horizontally disposed propeller mounted on said shaft and positioned within said offset portion; and means for rotating said shaft.

6. In an aeroplane having a body, a kite shaped wing comprising: a top and a bottom, said bottom forming a top for the body and meeting at its outer edges with said top, and said top being inclined outwardly therefrom toward the center and provided with an opening in its center; an inwardly offset portion on said bottom in registration with the opening in said top and having an opening formed therein; a rotatable shaft projected centrally through said offset portion; a horizontally disposed propeller fixedly mounted on said shaft and positioned within said offset portion; and a pair of oppositely faced trough shaped blades fixedly mounted on said shaft and rotatable in unison therewith below said offset portion, said blades being slightly inclined to the horizontal.

In testimony whereof I have signed the foregoing specification.

SIMON HEIDEN.